US008296646B2

(12) United States Patent
Weitzman et al.

(10) Patent No.: US 8,296,646 B2
(45) Date of Patent: Oct. 23, 2012

(54) FOCUSING ON AREAS OF THE DISPLAY OF TABULAR DATA THROUGH HIERARCHICAL COLLAPSING AND EXPANDING OF CELL AREAS

(75) Inventors: Louis M. Weitzman, Brookline, MA (US); Alister Lewis-Bowen, Cambridge, MA (US)

(73) Assignee: International Business Machines Corporation, Armonk, NY (US)

( * ) Notice: Subject to any disclaimer, the term of this patent is extended or adjusted under 35 U.S.C. 154(b) by 1850 days.

(21) Appl. No.: 11/049,396

(22) Filed: Feb. 2, 2005

(65) Prior Publication Data

US 2006/0174189 A1    Aug. 3, 2006

(51) Int. Cl.
*G06F 17/00* (2006.01)
(52) U.S. Cl. .......................... 715/218; 715/212; 715/227
(58) Field of Classification Search .......... 715/503–504, 715/509–510, 212–218, 802–803, 800, 859–860, 715/227
See application file for complete search history.

(56) References Cited

U.S. PATENT DOCUMENTS

| | | | |
|---|---|---|---|
| 5,255,356 A | 10/1993 | Michelman et al. | 715/504 |
| 5,450,538 A | 9/1995 | Glaser et al. | 715/508 |
| 5,950,168 A | 9/1999 | Simborg et al. | 705/3 |
| 6,057,837 A * | 5/2000 | Hatakeda et al. | 715/765 |
| 6,084,585 A | 7/2000 | Kraft et al. | 715/733 |
| 6,115,759 A | 9/2000 | Sugimura et al. | 710/52 |
| 6,408,301 B1 * | 6/2002 | Patton et al. | 707/102 |
| 6,438,565 B1 | 8/2002 | Ammirato et al. | 715/503 |
| 6,711,715 B1 | 3/2004 | Grealish | 715/504 |
| 2001/0040585 A1 * | 11/2001 | Hartford et al. | 345/667 |
| 2002/0069221 A1 * | 6/2002 | Rao et al. | 707/509 |
| 2003/0188256 A1 | 10/2003 | Aureglia et al. | 715/503 |
| 2003/0188257 A1 | 10/2003 | Aureglia et al. | 715/503 |
| 2003/0188258 A1 | 10/2003 | Aureglea et al. | 715/503 |
| 2003/0188259 A1 | 10/2003 | Aureglia et al. | 715/503 |

FOREIGN PATENT DOCUMENTS

EP    1 256 890 A2    11/2002

OTHER PUBLICATIONS

"Getting Results with Microsoft Office 97", Microsoft, 1997, pp. 222-225, 500-501.*

(Continued)

*Primary Examiner* — Amelia Rutledge
(74) *Attorney, Agent, or Firm* — John E. Campbell; Floyd A. Gonzalez (57) ABSTRACT

A method, apparatus and program product for focusing the display of tabular data wherein the display has multiple rows and columns of cells. A computer running a tabular data application includes a display for displaying the tabular data. The tabular data application includes a routine for defining a user defined area in the tabular data display in a focused display. The routine places indicators at the top, bottom, right side and left side of the focused display. The indicators may be one of an expand indicator or a collapse indicator. A movable cursor in the tabular data display is used to select at least one of the indicators for focusing the display. The routine in the tabular data application expands or collapses the display of tabular data to give a focused display. The expanding or collapsing of the display is determined by whether the selected indicator is an expand indicator or a collapse indicator.

20 Claims, 10 Drawing Sheets

OTHER PUBLICATIONS

Rao et al. "The table lens: merging graphical and symbolic representations in an interactive focus + context visualization for tabular information", CHI 94, pp. 318-322, 1994.*

Torres, Spreadsheet Data Visualization, Research Disclosure n334 0292(Feb. 1992), 2 pages.

Anonymous,Spreadsheet Data Visualization, Research Disclosure, Database No. 334052 (Feb. 1992), 1 page.

* cited by examiner

FOCUSING ON AREAS OF THE DISPLAY OF TABULAR DATA THROUGH HIERARCHICAL COLLAPSING AND EXPANDING OF CELL AREAS

FIELD OF THE INVENTION

This invention relates to computer tabular data, and more particularly related to focusing of areas of spreadsheets through hierarchical collapsing of cells.

BACKGROUND OF THE INVENTION

Selected rows or columns of adjacent cells in computer tabular data such as a spreadsheet can be hidden to allow a user to reduce the amount of information that might be distracting. The prior art before the present invention is limited in its ability to allow the user to focus on arbitrary regions of data in the spreadsheet.

U.S. Pat. No. 5,255,356 issued Oct. 19, 1993 to Michelman et al. for METHOD FOR HIDING AND SHOWING SPREADSHEET CELLS, discloses a method for hiding and showing spreadsheet cells of a worksheet being displayed on a computer system display means.

U.S. Pat. No. 5,450,538 issued Sep. 12, 1995 to Glaser et al. for GRAPHICAL USER INTERFACE CONTROL FOR EXPANSION AND RE-SIZING OF DATA FIELDS IN FORMS discloses a computer interface system employing a menu-graphical user interface for the entry of text data in a data store receiving user inputs for controlling the graphical user interface.

U.S. Pat. No. 5,950,168 issued Sep. 7, 1999 to Simborg et al. for COLLAPSIBLE FLOWSHEET FOR DISPLAYING PATIENT INFORMATION IN AN ELECTRONIC MEDICAL RECORD discloses a user interface which presents patient data on a computer display to a health care provider as a flowsheet including an array of category labels with indications of whether the category is in a collapsed state or an expanded state.

U.S. Pat. No. 6,084,585 issued Jul. 4, 2000 to Kraft et al. for SYSTEM FOR DIRECTLY ACCESSING FIELDS ON ELECTRONIC FORMS, discloses a computer system which provides a graphical user interface to assist a user in completing electronic forms.

U.S. Pat. No. 6,115,759 issued Sep. 5, 2000 to Sugimura et al. for SYSTEM FOR DISPLAYING DESIRED PORTIONS OF A SPREADSHEET ON A DISPLAY SCREEN BY ADJOINING THE DESIRED PORTIONS WITHOUT THE NEED FOR INCREASING THE MEMORY CAPACITY discloses a data processing apparatus having a spreadsheet data storing section for storing spreadsheet data, a spreadsheet creating section for creating a spreadsheet consisting of at least one row and at least one column and a display section for displaying the spreadsheet on a screen. The data processing apparatus includes an inputting section for designating a row or a column to be subjected to a non-display operation, a non-display controlling section for removing row or column data in the non-display operation, and controlling the display section to display a modified spreadsheet by moving rows or columns previously located adjacent to the removed row or column into adjoining relation.

U.S. Pat. No. 6,438,565 B1 issued Aug. 20, 2002 to Ammirato et al. for SYSTEM AND METHODS FOR IMPROVED SCENARIO MANAGEMENT IN AN ELECTRONIC SPREADSHEET discloses an electronic spreadsheet including a scenario manager having a preferred interface and method for creating and managing various versions or scenarios of a spreadsheet model. Methods are provided for specifying an area of the model to track and capture various versions of the base model.

U.S. Pat. No. 6,711,715 B1 issued Mar. 23, 2004 to Grealish for METHOD AND SYSTEM FOR EFFICIENT STORAGE AND RESTORATION OF DISPLAY STATE DATA discloses storage and restoration of display state data for a display object having a display state that can be altered by display state changes made to other display objects in a hierarchical data structure where the display state of the display object being stored has more than on superior display object.

U.S. Patent Application Publication Number US 2003/0188256 A1, published Oct. 2, 2003 by Augeglia et al. for SYSTEM AND METHOD IN AN ELECTRONIC SPREADSHEET FOR COPYING AND POSTING DISPLAYED ELEMENTS OF A RANGE CELLS, and US 2003/0188257 A1, US 2003/0188258 A1, and US 2003/188259 A1 published Oct. 2, 2003 by Aureglia et al. for SYSTEM AND METHOD IN AN ELECTRONIC SPREADSHEET FOR DISPLAYING AND/OR HIDING RANGE OF CELLS, all disclose a method, system and computer program for copying and pasting, in an electronic multidimensional spreadsheet, displayed elements of a source range of cells onto a destination range of cells, the source range of cells including one or more elements displayed on a user interface and one or more hidden elements, the elements being contiguous and aligned along a given spreadsheet dimension.

European Patent Application EP 1 256 890 A2 published Nov. 13, 2002 for Vosheli for SYSTEMS AND METHODS PROVIDING DYNAMIC SPREADSHEET FUNCTIONALITY discloses a system and method for supporting and/or enabling the creation of dynamic reports and/or data presentations in connection with a spreadsheet-based formatting and calculation capabilities. The disclosed system and method generally include an electronic spreadsheet having a plurality of cells that are arrayed in a defined number of columns and rows, a database in communication with the electronic spreadsheet, and an expansion formula that functions to control retrieval of data from the database and automatically varies/expands at least one of the defined number of columns and rows to accommodate the data retrieval.

An article by Torres, SPREADSHEET DATA VISUALIZATION, Research Disclosure n334 02-92 (February 1992) discusses techniques to enhance processing of spreadsheet or deficiencies including the spreadsheet to be oriented along different axes in order to see the data from different perspectives, and to allow temporary hide/remove/add of rows and columns, as well as zoom in/out.

SUMMARY OF THE INVENTION

The shortcomings of the prior art are overcome and additional advantages are provided through the provision of a system to allow a user to focus on arbitrary regions of relevant data. The user hierarchically hides sections of data over arbitrary two dimension regions of the spreadsheet. This is especially useful within a large spreadsheet of numbers or images.

The present invention provides a system and method for focusing on relevant information by selectively collapsing the irrelevant cells. This may be done manually or automatically based on selection of relevant cells for exposing only the highlighted cells of interest.

The present invention provides a system and method wherein the user drags a cursor over a cell that has collapsible neighbors. The system and method further includes icons indicating the direction of collapsing. After a collapse operation is complete, a visual representation allowing the user to expand the cells. These indicators may take the form of plus (+) or minus (−) icons, directional arrows, ellipsis, or other graphic icons to indicate the two possible operations of collapsing and expanding regions of interest.

System and computer program products corresponding to the above-summarized methods are also described and claimed herein.

Additional features and advantages are realized through the techniques of the present invention. Other embodiments and aspects of the invention are described in detail herein and are considered a part of the claimed invention. For a better understanding of the invention with advantages and features, refer to the description and to the drawings.

BRIEF DESCRIPTION OF THE DRAWINGS

The subject matter which is regarded as the invention is particularly pointed out and distinctly claimed in the claims at the conclusion of the specification. The foregoing and other objects, features, and advantages of the invention are apparent from the following detailed description taken in conjunction with the accompanying drawings in which:

The detailed description explains the preferred embodiments of the invention, together with advantages and features, by way of example with reference to the drawings.

DETAILED DESCRIPTION OF THE INVENTION

Figure 1:
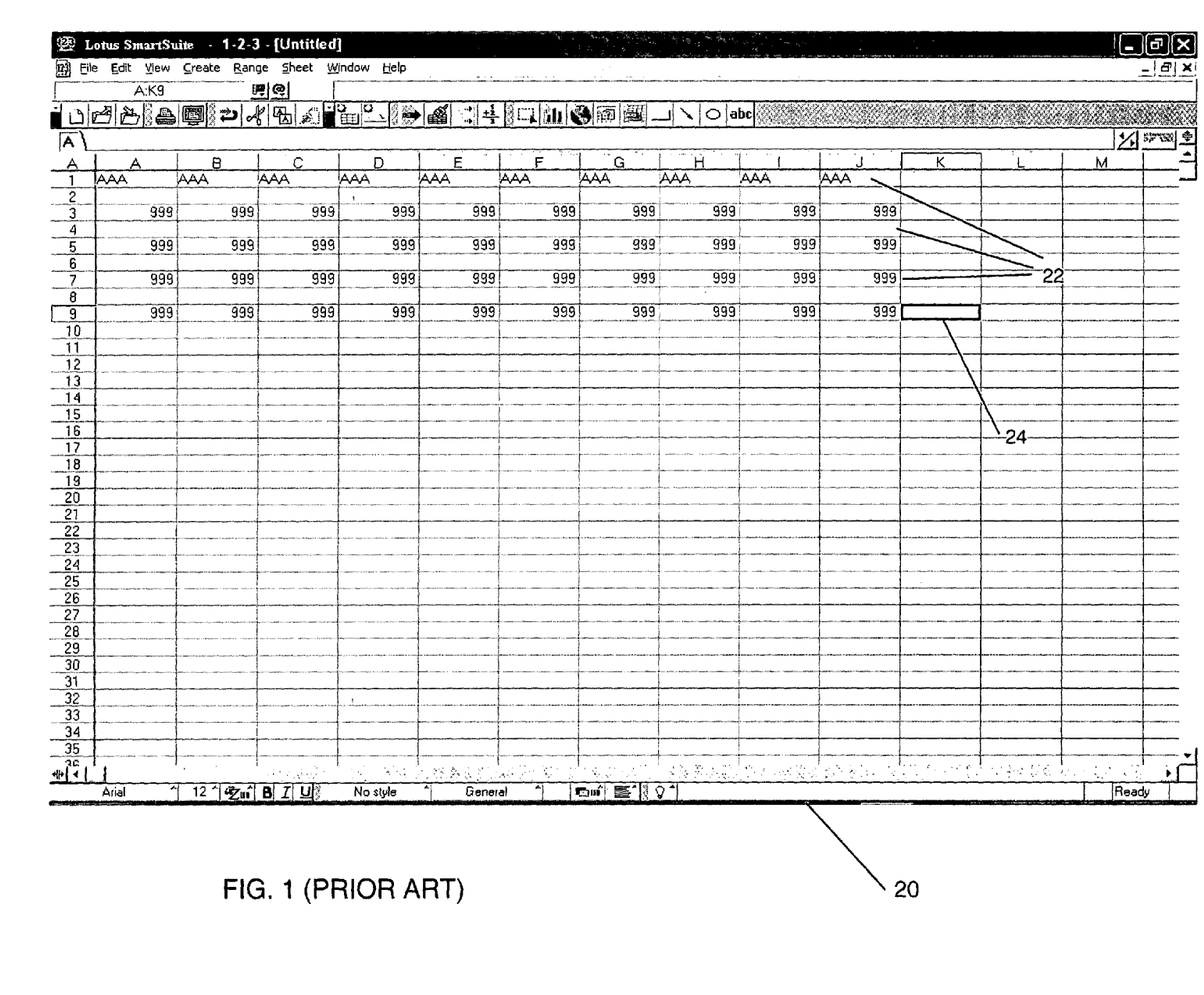
FIG. 1 illustrates a screen capture of a prior art spreadsheet of a plurality of cells arranged in rows and columns.

FIG. 1 illustrates a prior art screen capture 20 of a spreadsheet application such as 1-2-3 from Lotus and having a plurality of cells 22 arranged in rows 1-36 and columns A-M. As is well known, each cell 22 may contain alphabetic characters illustrated by AAA, or numeric characters illustrated by 999, or a combination of both. The characters are inputted into or modified in selected cells by use of a curser icon 24, or calculated from data in other cells, as is known. The present invention allows a user to focus on selected cells by collapsing the display of irrelevant cells or expanding the display of relevant cells, as will be described.

Figure 2:
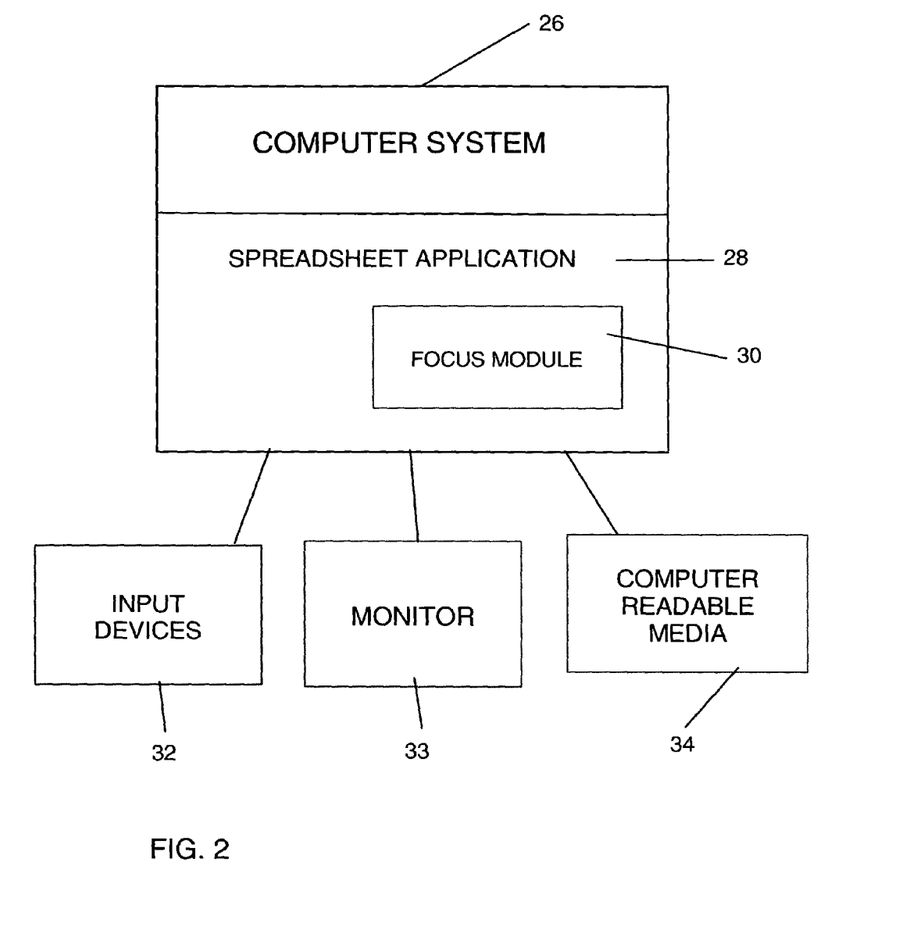
FIG. 2 is a block diagram of a computer system including a spreadsheet application having a focus module of the present invention.

FIG. 2 is a block diagram of a computer system 26 usable with the present invention. The computer system 26 includes a spreadsheet application 28 being executed by the computer system 26. The spreadsheet application 28 includes a focus module 30 for collapsing and/or expanding the display of cells. The computer 26 additional includes input devices 32 for inputting data into the cells 22, as previously discussed, or selecting rows, columns or areas to be collapsed or expanded, as will be explained. The computer system 26 further includes a monitor 33 for displaying the spreadsheet of FIG. 1 focus module 30, and a computer readable media 34 for storing computer readable code for the spreadsheet application 28 for data used in the application. The computer readable media 34 may include computer RAM, ROM, hard drive, disk, diskette, tape, other electronic or optic media.

Figure 3A:
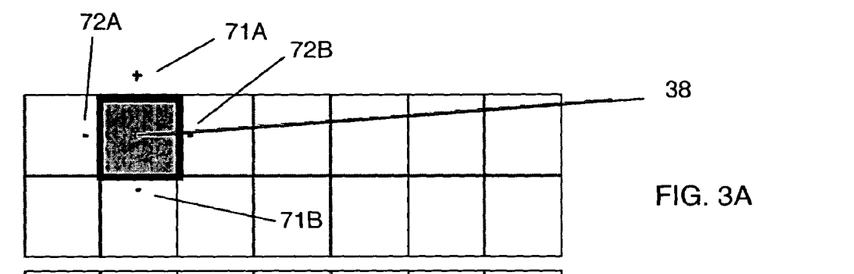
FIGS. 3A, 3B and 3C illustrate the definitions of the set of cells, boundaries, edges and indicators used by the focus module 30 of FIG. 2.
Figure 3B:
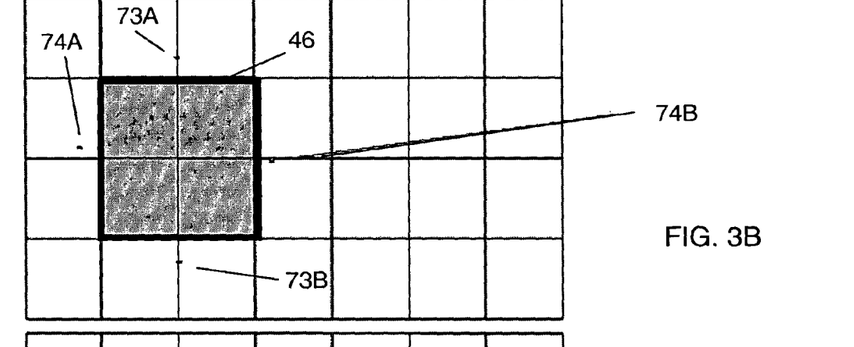
Figure 3C:
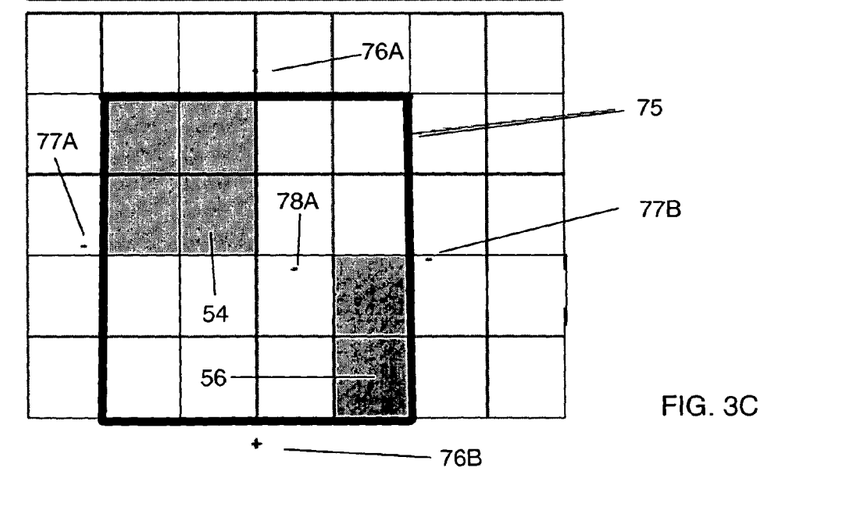

FIGS. 3A, 3B and 3C illustrate the definitions of the set of cells, boundaries, edges and indicators used by the focus module 30 of FIG. 2. FIG. 3A illustrates a boundary defined by a single cell 38 having a top indicator 71A (+), and bottom indicator 71B (−), a left indicator 72A (−), and a right indicator 72B (−). The (+) indicator 71A indicates that the cells above 38 may be expanded, and the (−) indicators 71B, 72A and 72B indicate that cells below and to either side of cell 38 may be collapsed. FIG. 3B illustrates a boundary defined by a two dimensional area 46 of selected cells; the area 46 having a (−) indicator 73A above the area 46, a (−) indicator 73B below area 46, a (−) indicator 74A to the left of area 46, and a (−) indicator 74B. As before mentioned, a (−) indicator indicates that areas may be collapsed by a user. It will be understood that if the indicators are (+), the areas indicated by the indicators may be expanded. FIG. 3C illustrates an automatically generated area boundary 75 based on the user selections. The area boundary 75 is a computed boundary based on user selected cells and contains discontinuous areas 54 and 56. The indicators 76A, 76B, 77A and 77B indicate that areas may be expanded (+) or collapsed (−) on the sides of the area boundary 75. An internal indicator 78A aids in the collapse or expansion of internal cells between the selected cell areas 54 and 56 within the area boundary 75.

Figure 4:
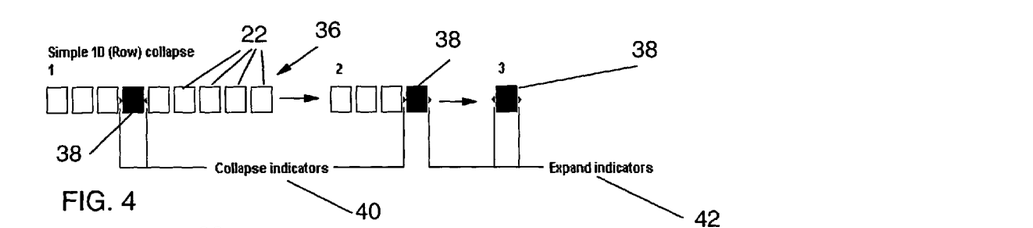
FIG. 4 illustrates a simple one dimension row collapse operation of the focus module of FIG. 2.

FIG. 4 illustrates a one dimension simple collapse. A row 36 of cells 22 includes a highlighted cell 38 with collapse indicators 40 to indicate a collapse operation. The indicators display two possible collapse operations, one from the left and one from the right. The operations go from step 1 to step 2, and then to step 3. In step 1, the user clicks on the right indicator and FIG. 4, step 2 is displayed. When part of a row is collapsed by clicking of the collapse indicator 40, the expand indicator 42 is shown. The user can collapse from the left by clicking on the collapse indicator 40 on the left, or expand on the right by clicking on the expand indicator 42 on the right. If the user collapses on the left, the indicator on the left is clicked and the row is collapsed from the left as shown in FIG. 4, step 3.

Figure 5:
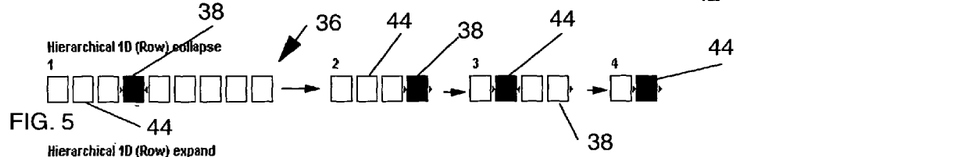
FIG. 5 illustrates a hierarchical one dimension row collapse operation of the focus module of FIG. 2.

FIG. 5 illustrates a hierarchical collapse. Steps 1 and 2 in FIG. 5 are the same as steps 1 and 2 in FIG. 4. In step 3, the user highlights a new cell 44 in row 36. The user then clicks on the collapse indicator to the right of cell 44 to display FIG. 5, step 4.

Figures 6, 7:
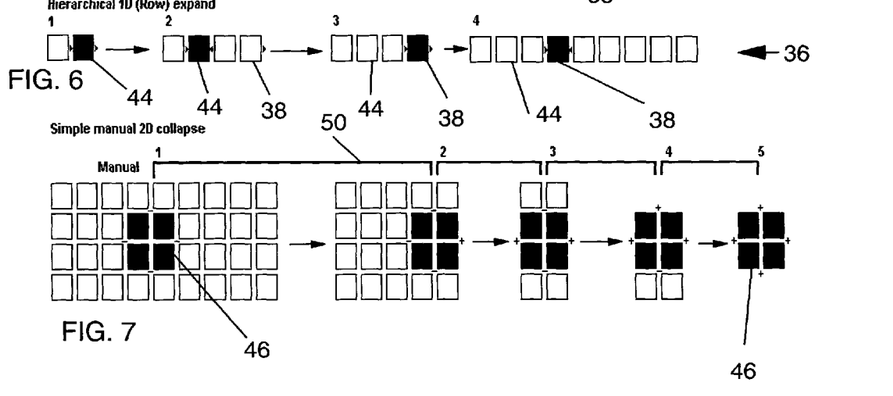
FIG. 6 illustrates a hierarchical one dimension row expand operation of the focus module of FIG. 2.
FIG. 7 illustrates a simple, manual two dimension area collapse operation of the focus module of FIG. 2.

FIG. 6 illustrates the expansion of the cells 44 and 38 of FIG. 5, from step 4 back to the original row 36 in FIG. 5, step 1. The expansion indicator on the right of cell 44 is clicked, and the cells to the right of cell are expanded as shown in FIG. 6, step 2. The user then shifts focus to cell 38, as shown in FIG. 6, step 3. The expand indicator on the right of cell 38 is then clicked, and the cells on the right of cell 38 are displayed, as shown in FIG. 6, step 4.

Figure 8:
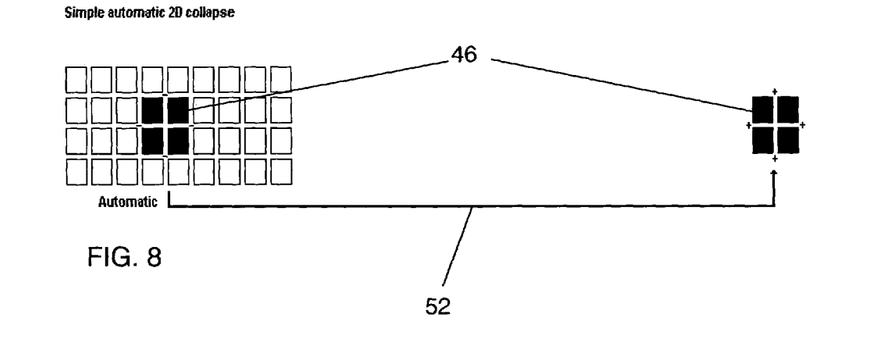
FIG. 8 illustrates a simple, automatic two dimension area collapse operation of the focus module of FIG. 2.

In FIG. 7, a simple, manual two dimension collapse is illustrated. The user collapses the neighbors to the selected area 46 first in the horizontal direction (steps 2 and 3) and then in the vertical direction (step 4 and 5). In this operation, + and − icons show when the user can expand and collapse the hidden cells. A manual two dimension collapse operation of four user actions is shown at 50, steps 1, 2, 3, 4 and 5. FIG. 8 illustrates a simple, automatic two dimension collapse operation 52 (one action from FIG. 7, step 1 to step 5). The automatic two dimension collapse operation 52 may be entered, for example, by accessing a menu or by a specific combination of keystrokes, as desired.

It will be understood that the illustrated technique may also be used for three-dimensional data such as for spreadsheets in a cube.

Figure 9:
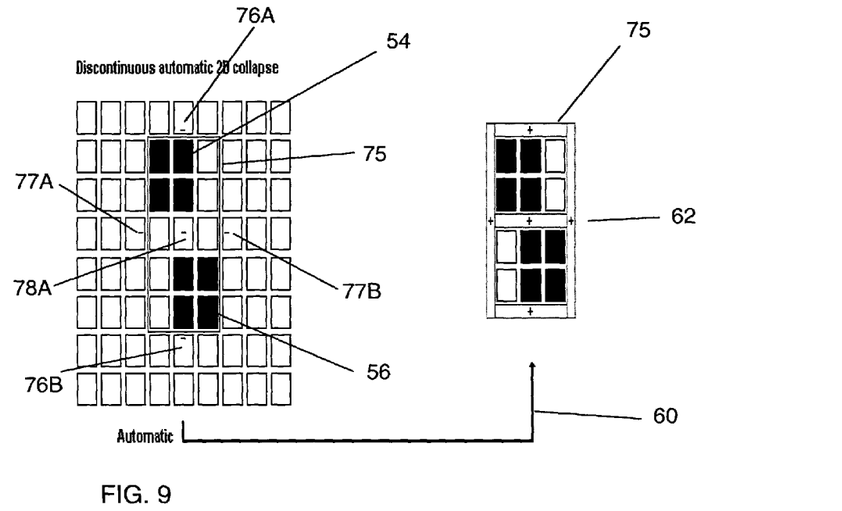
FIG. 9 illustrates an automatic (one-step) discontinuous two dimension area collapse operation of the focus module of FIG. 2.

FIG. 9 illustrates an auto collapse 60 of two discontinuous, two dimension areas 54 and 56. As illustrated in FIG. 7, horizontal and vertical collapses are done around each of the areas 54 and 56 to give the collapsed area boundary 75. The reference numbers for the indicators 76, 77 and 78 and the area boundary 75 are the same as those used in FIG. 3C. There is a collapsed row between the regions 54 and 56 which is represented by a smaller row 62 with expansion indicators (+).

Figure 10:
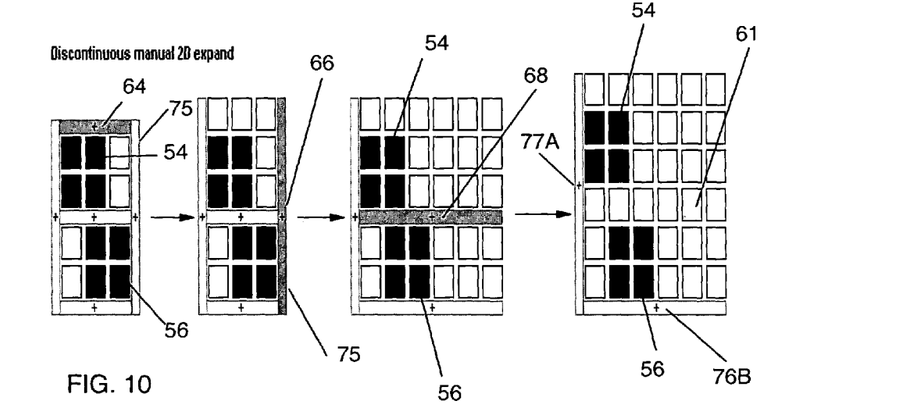
FIG. 10 illustrates a discontinuous two dimension expand operation of the focus module of FIG. 2.

FIG. 10 illustrates a discontinuous two dimension expand which undoes the collapse operation of FIG. 9. Clicking on the expand indicator 64 expands in the vertical direction above the area boundary 75. Clicking on the expand icon 66 on the right of area boundary 75 expands the area to the right. Clicking on the interior indicator 68 between the areas 54 and 58 expands the row of cells 61 between the areas 54 and 56. Restoring the area back to the original display will result when the expand indicators on the left 77A and bottom 76B are clicked.

Figure 11:
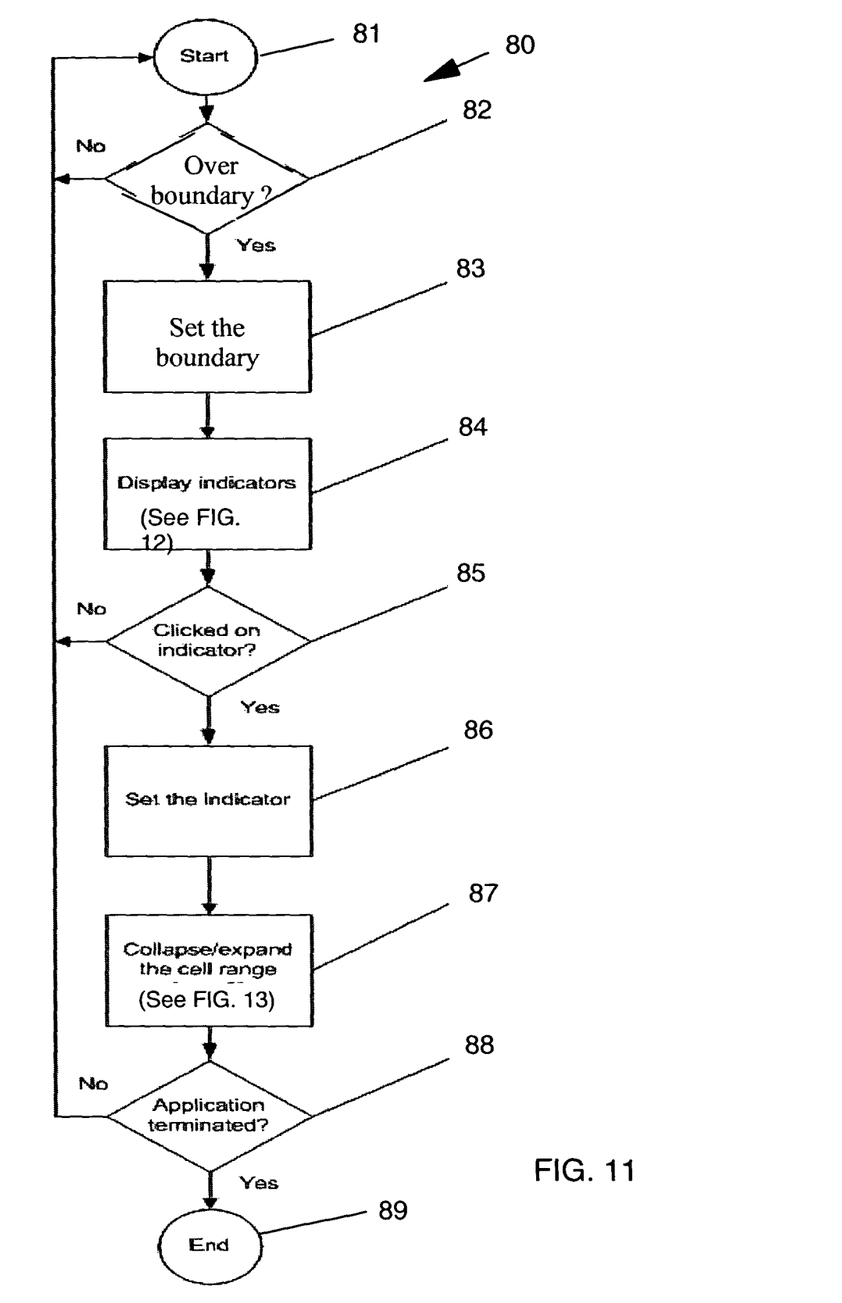
FIG. 11 is a flowchart of a routine which is part of the focus module 30 to provide an interactive collapse/expand of a cell range on the edge of a selected boundary.

FIG. 11 is a flowchart 80 of a routine which is part of the focus module 30 to provide an interactive collapse/expand of a cell range on the edge of a selected boundary. The flowchart 80 starts at 81, and goes to check 82 to determine if the cursor is over the boundary enclosing groups of selected cells. If the check at 82 is no, the routine returns to start 81. If the check at 82 is yes, the routine at 83 sets the boundary to make this boundary a selected entity. At 84, display indicators determine what collapse/expand indicators need to be displayed at the edges of the selected boundary, and will be further explained in connection with FIG. 12. A check is made at 85 to determine if the user has clicked on one of the collapse/expand indicators. If the check at 85 is no, the routine returns to start at 81. If the check at 85 is yes, the indicator is set at 86 to make this indicator a selected entity. At 87, the routine collapses/expands the cell range associated with the selected indicator, and is further explained in connection with FIG. 13. A check is made at 88 to determine if the user of the system terminated the application within which the technology is operating. If the check at 88 is no, the routine returns to start at 81. If the check at 88 is yes, the routine goes to end 89.

Figure 12:
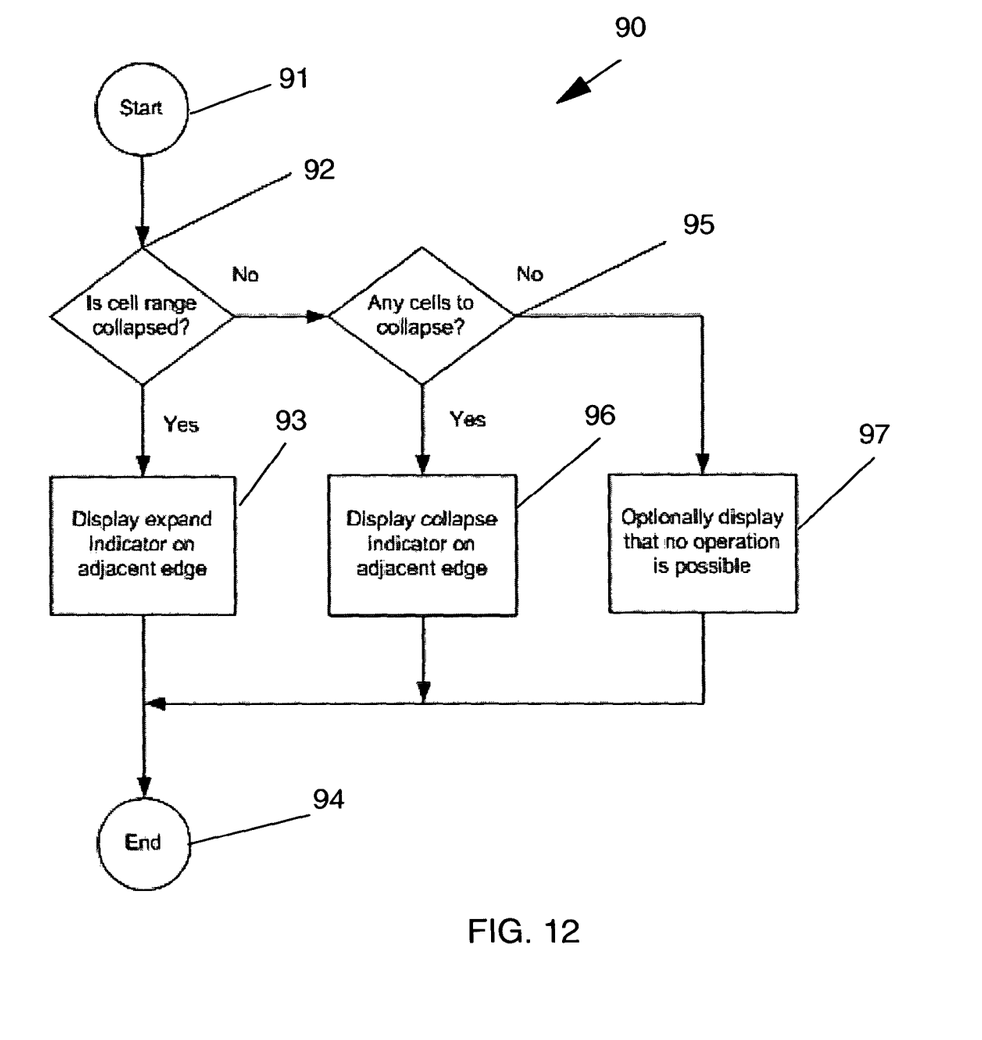
FIG. 12 is a display of the collapse/expand indicators routine for the indicators on the edge of a selected area of cells or boundary of a group of selected cells of the flowchart of FIG. 11.

FIG. 12 is a flowchart of the collapse/expand indicators routine 90 for each indicator on the edge of the selected boundary as shown in 84 of the flowchart of FIG. 11. It will be understood that the routine 90 will be repeated for each indicator (typically four) on the edge of the boundary. The display routine 90 starts at 91 and goes to a check at 92 to check the data store for a collapsed cell range associated with this edge of the selected boundary. If the check at 92 is yes, the routine displays a expand indicator on the adjacent edge at 93, and ends at 94. If the check at 92 is no, a check is made at 95 to determine if there are any adjacent cells on this edge of the selected boundary that can be collapsed. If the check at 95 is yes, at 96 the routine displays a collapse indicator on the adjacent edge and ends at 94. If the check at 95 is no, the routine at 97 optionally displays that no operation is possible and the routine ends at 94.

Figure 13:
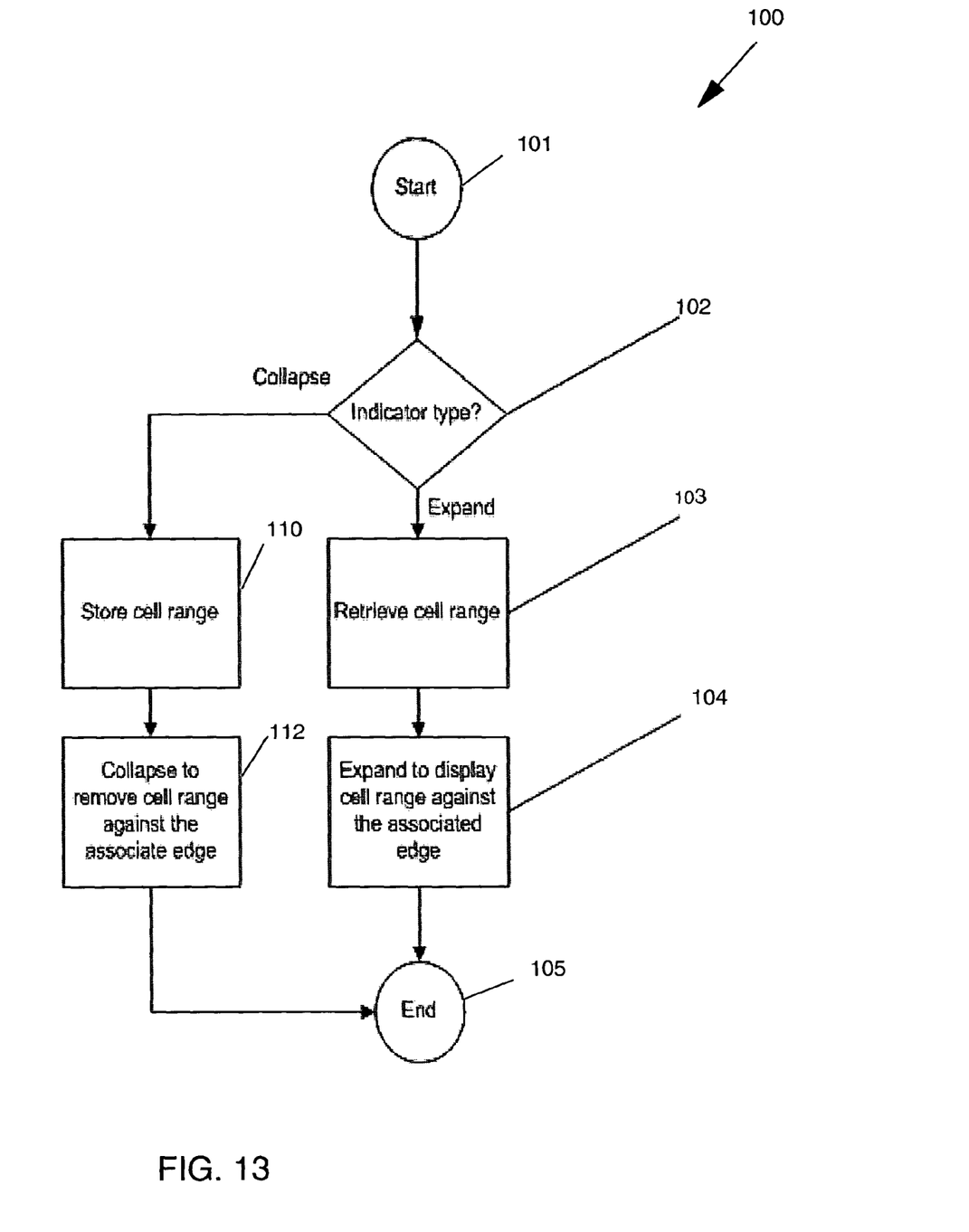
FIG. 13 is a collapse/expand routine to collapse/expand the cell range associated with the selected indicator of FIG. 11

FIG. 13 is a collapse/expand routine 100 to collapse/expand the cell range associated with a selected indicator as shown at 87 of FIG. 11 to expand or collapse one edge of the boundary. The routine 100 starts at 101 and makes a check at 102 to check that the selected indicator is an expand indicator or a collapse indicator. If the check at 102 is an expand indicator, at 103 a retrieve is made from the data store in computer readable media 34, the last level of cells collapsed against the edge associated with the selected indicator. At 104, the routine expand to display the cell range against the associated edge by rearranging the tablature display to include the retrieved cell range against the edge associated with the selected indicator. The routine then ends at 105. If the check at 102 is collapse, at 110 the cell range is stored in the data store in computer readable media 34. At 112, the routine performs a collapse operation to remove the cell range against the associated edge, and the routine ends at 105.

Figure 14:
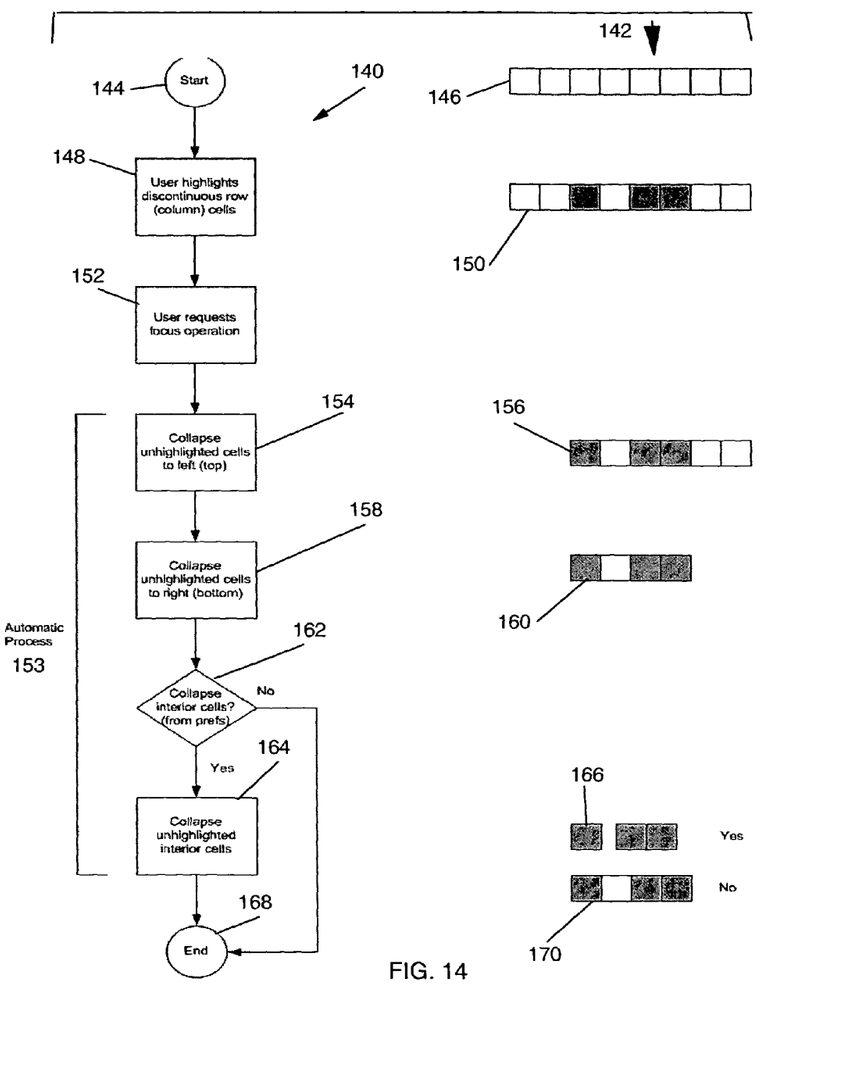
FIG. 14 is a flowchart for the automatic focus or collapse of a row (column) of the focus module of FIG. 2.

FIG. 14 is a flowchart to the automatic collapse of a row (column) of the focus module of FIG. 2. The flowchart is shown in the left hand column 140, and an illustration of the routine operation is shown in the right hand column 142. The flowchart starts at 144 for a row of cells 146. The user, at 148 highlights a potentially discontinuous set of cells in a row (column) as shown in 150. At 152, the user requests a focus operation by selecting a menu. The automatic process 153 performs the focus operation, as will be discussed. It will be understood that the process 153 may be done incrementally by the user to perform a manual operation, if desired.

At 154, the process collapses unhighlighted cells to the left (top) as shown at 156. At 158, the process collapses unhighlighted cells to the right (bottom) as shown at 160. At 162, a check is made to determine if any interior cells are to be collapsed. The automatic collapse of interior cells can be set as a user preference. If the check at 162 is yes. The unhighlighted interior cells are collapsed at 164 as shown at 166, and ends at 168. If the check at 162 is no, the routine ends at 168, as shown at 170.

Figure 15:
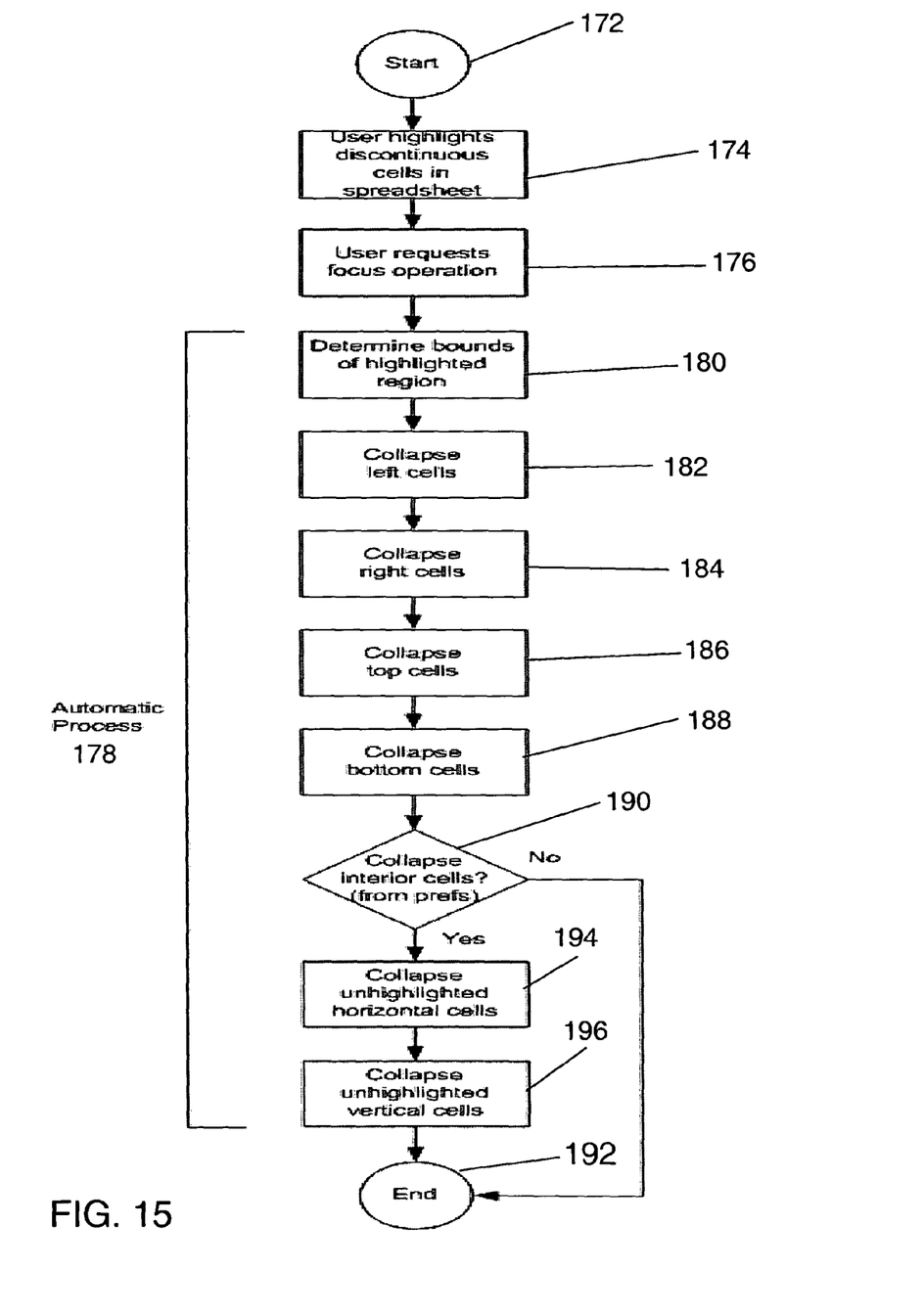
FIG. 15 is a flowchart for the automatic focus or collapse of a two dimension area of the focus module of FIG. 2.

FIG. 15 is a flowchart for the automatic collapse of a two dimension area of the focus module of FIG. 2. The flowchart starts at 172, and at 174 the user highlight discontinuous cells in the spreadsheet. At 176, the user requests a focus operation, such as from a context menu. The routine then starts an automatic process at 180. Again, it will be understood that the process 178 may be executed incrementally to provide a manual process.

At 180, the routine determines the bounds of the highlighted region. At 182, the left cells are collapsed. At 184, the right cells are collapsed. At 186, the top cells are collapsed. At 188, the bottom cells are collapsed. A check is made at 190 to determine if interior cell are to be collapsed as determined by the preferences indicated by the user. If the check at 190 is no, the routine ends at 192. If the check at 190 is yes, at 194 the routine collapses the unhighlighted horizontal cells. At 196, the routine collapses the unhighlighted vertical cells.

It will be understood that the focus module expands the display by doing an expand operation instead of a collapse operation, by changing the "collapse" operation with an "expand" operation as discussed in the FIGS. 9-13.

Although the embodiment disclosed is spreadsheet specific, it will be understood that the invention may be used with any other tabular forms of data, and is not limited to spreadsheet applications alone.

The capabilities of the present invention can be implemented in software, firmware, hardware or some combination thereof.

As one example, one or more aspects of the present invention can be included in an article of manufacture (e.g., one or more computer program products) having, for instance, computer usable media. The media has embodied therein, for instance, computer readable program code means for providing and facilitating the capabilities of the present invention. The article of manufacture can be included as a part of a computer system or sold separately.

Additionally, at least one program storage device readable by a machine, tangibly embodying at least one program of instructions executable by the machine to perform the capabilities of the present invention can be provided.

The flow diagrams depicted herein are just examples. There may be many variations to these diagrams or the steps (or operations) described therein without departing from the spirit of the invention. For instance, the steps may be performed in a differing order, or steps may be added, deleted or modified. All of these variations are considered a part of the claimed invention.

While the preferred embodiment to the invention has been described, it will be understood that those skilled in the art, both now and in the future, may make various improvements and enhancements which fall within the scope of the claims which follow. These claims should be construed to maintain the proper protection for the invention first described.

What is claimed is:

1. A method of focusing the display of tabular data having multiple cells arranged in rows and columns, said method comprising:
    defining a defined area in tabular data to be displayed in a focused display;
    determining indicators to be placed at the top side, bottom side, right side and left side of the focused display, said indicators to be one of an expand indicator or a collapse indicator, said expand indicator indicating that cells on that side of the focused display are collapsed and may be expanded, and said collapse indicator indicating that cells on that side of the focused display are expanded and may be collapsed;
    selecting at least one of the indicators for focusing the display; and
    expanding or collapsing the display of the tabular data to give the focused display, the expanding or collapsing determined by whether the selected indicator is an expand indicator or a collapse indicator such that expanding of the display includes adding cells of data to the selected side and collapsing of the display includes removing cells of data from the selected side.

2. The method according to claim 1 wherein said defined area is a single cell of the spreadsheet.

3. The method according to claim 1 wherein said defined area is a group of cells arranged in a two dimensional area.

4. The method according to claim 1 wherein said defined area is within an automatically generated boundary based on user selected cells, said automatically generated boundary containing at least two discontinuous areas.

5. The method according to claim 4 wherein said automatically generated boundary is a single row having more than one cell, and said discontinuous areas are made up of cells in said single row.

6. The method according to claim 4 wherein said automatically generated boundary is a single column having more than one cell, and said discontinuous areas are made up of cells in said single column.

7. The method according to claim 4 wherein said automatically generated boundary is a two dimensional area having multiple rows and columns, and said discontinuous areas are two dimensional areas.

8. The method according to claim 7 further comprising providing within said automatically generated boundary, an internal indicator between said discontinuous areas indicating if the space between said discontinuous areas may be expanded or collapsed.

9. An apparatus for focusing the display of tabular data, said apparatus comprising:
    a computer having a tabular data application wherein the tabular data has multiple rows and columns of cells, and a display for displaying the tabular data;
    a routine in said tabular data application for defining a defined area to be displayed in a focused display;
    a routine in said tabular data application placing indicators at the top side, bottom side, right side and left side of the focused display, said indicators to be one of an expand indicator or a collapse indicator, said expand indicator indicating that cells on that side of the focused display are collapsed and may be expanded, and said collapse indicator indicating that cells on that side of the focused display are expanded and may be collapsed;
    a movable cursor in the spreadsheet display for selecting at least one of the indicators for focusing the display; and
    a routine in said tabular data application expanding or collapsing the display to give a focused display, the expanding or collapsing determined by whether the selected indicator is an expand indicator or a collapse indicator such that expanding of the display includes adding cells of data to the selected side and collapsing of the display includes removing cells of data from the selected side.

10. The apparatus according to claim 9 wherein said defined area is within an automatically generated boundary based on user selected cells, said automatically generated boundary containing at least two discontinuous areas.

11. The apparatus according to claim 10 wherein said automatically generated boundary is a two dimensional area having multiple rows and columns, and said discontinuous areas are two dimensional areas.

12. The apparatus according to claim 11 wherein said automatically generated boundary contains an internal indicator between said discontinuous areas indicating if the space between said discontinuous area may be expanded or collapsed.

13. A program product usable with a system for focusing the display of tabular data having multiple cells arranged in rows and columns, said program product comprising:
    a computer readable medium having recorded thereon computer readable program code performing the method comprising:
    defining a defined area in a display of tabular data in a focused display;
    determining indicators to be placed at the top side, bottom side, right side and left side of the focused display, said indicators to be one of an expand indicator or a collapse indicator, said expand indicator indicating that cells on that side of the focused display are collapsed and may be expanded, and said collapse indicator indicating that cells on that side of the focused display are expanded and may be collapsed;

selecting at least one of the indicators for focusing the display; and expanding or collapsing the display of tabular data to give the focused display, the expanding or collapsing determined by whether the selected indicator is an expand indicator or a collapse indicator such that expanding of the display includes adding cells of data to the selected side and collapsing of the display includes removing cells of data from the selected side.

14. The program product according to claim 13 wherein said defined area is a single cell of the spreadsheet.

15. The program product according to claim 13 wherein said defined area is a group of cells arranged in a two dimensional area.

16. The program product according to claim 13 wherein said defined area is within an automatically generated boundary based on user selected cells, said automatically generated boundary containing at least two discontinuous areas.

17. The program product according to claim 16 wherein said automatically generated boundary is a single row having more than one cell, and said discontinuous areas are made up of cells in said single row.

18. The program product according to claim 16 wherein said automatically generated boundary is a single column having more than one cell, and said discontinuous areas are made up of cells in said single column.

19. The program product according to claim 16 wherein said automatically generated boundary is a two dimensional area having multiple rows and columns, and said discontinuous areas are two dimensional areas.

20. The program product according to claim 19 wherein said method further comprises providing within said automatically generated boundary, an internal indicator between said discontinuous areas indicating if the space between said discontinuous areas may be expanded or collapsed.

* * * * *